US008951682B2

(12) United States Patent
Yager (10) Patent No.: US 8,951,682 B2
(45) Date of Patent: Feb. 10, 2015

(54) RECHARGEABLE ZINC AIR BATTERY AND ANODE (75) Inventor: Thomas A. Yager, Encinitas, CA (US)

(73) Assignee: Empire Technology Development LLC, Wilmington, DE (US)

(*) Notice: Subject to any disclaimer, the term of this patent is extended or adjusted under 35 U.S.C. 154(b) by 615 days.

(21) Appl. No.: 12/999,933

(22) PCT Filed: Sep. 30, 2010

(86) PCT No.: PCT/US2010/051016
§ 371 (c)(1),
(2), (4) Date: Dec. 17, 2010

(87) PCT Pub. No.: WO2012/044319
PCT Pub. Date: Apr. 5, 2012

(65) Prior Publication Data
US 2012/0082907 A1    Apr. 5, 2012

(51) Int. Cl.
H01M 8/22    (2006.01)
H01M 4/42    (2006.01)

(52) U.S. Cl.
USPC ............................ 429/409; 429/535; 29/623.5

(58) Field of Classification Search
USPC .................. 429/208, 209, 229, 233, 245, 406
See application file for complete search history.

(56) References Cited

U.S. PATENT DOCUMENTS

| 4,407,915 | A |   | 10/1983 | Brown |  |
| 4,957,826 | A |   | 9/1990  | Cheiky |  |
| 5,584,109 | A | * | 12/1996 | DiGiovanni et al. | 29/2 |
| 5,599,637 | A |   | 2/1997  | Pecherer et al. |  |
| 6,027,822 | A | * | 2/2000  | Blanyer et al. | 428/607 |
| 2004/0266895 | A1 |   | 12/2004 | Callahan et al. |  |
| 2005/0208386 | A1 | * | 9/2005  | Clarke | 429/347 |
| 2006/0093909 | A1 | * | 5/2006  | Zhang | 429/209 |
| 2006/0257744 | A1 |   | 11/2006 | Burchardt |  |

FOREIGN PATENT DOCUMENTS

JP    2004-319205    * 11/2004

OTHER PUBLICATIONS

Drillet, J.-F., et al., "Influence of CO2 on the stability of bifunctional oxygen electrodes for rechargeable zinc/air batteries and study of different CO2 filter materials : Electrochemical Energy Storage and Conversion," Physical Chemistry Chemical Physics (2001) 3:368-371.
Nikolova, V., et al., "Electrocatalysts and Electrode Design for Bifunctional Oxygen/Air Electrodes," NATO Science for Peace and Security Series B: Physics and Biophysics, Functionalized Nanoscale Materials Devices and Systems, 2008, pp. 305-310.
International Search Report and Written Opinion for International Application No. PCT/US2010/051016 mailed on Nov. 23, 2010.
Fu, L., et al., Design and fabrication of a micro zinc/air battery, Journal of Physics: Conference Series, 2006, International MEMS Conference 2006, pp. 800-805, 34, IOP Publishing Ltd., Bristol, UK.
Bullis, Kevin, High-Energy Batteries Coming to Market, MIT Technology Review, Oct. 28, 2009, accessed on Dec. 17, 2010 at http://www.technologyreview.com/business/23812/.
ReVolt Battery website, ReVolt Technology, accessed on Dec. 17, 2010 at http://www.revolttechnology.com/.
Technology Transfer / Zinc-Air Batteries, Paul Scherrer Institut Electrochemistry Laboratory, accessed on Dec. 17, 2010 at http://ecl.web.psi.ch/znair/index.html.

* cited by examiner

Primary Examiner — Alix Echelmeyer (57) ABSTRACT

Implementations and techniques for rechargeable zinc air batteries are generally disclosed.

26 Claims, 7 Drawing Sheets

RECHARGEABLE ZINC AIR BATTERY AND ANODE

BACKGROUND

Conventional zinc air batteries often include an anode that has zinc powder granules. During recharging of the battery, it may not be possible for the zinc powder granules to return to their original shape and/or orientation within the anode. Accordingly, such anodes may have increased metal migration, decreased metal-to-metal contact, and/or increased anode resistance as a result of recharging.

SUMMARY

This disclosure is drawn, inter alia, to methods, apparatus, and systems related to rechargeable zinc air batteries.

Some example apparatus related to rechargeable zinc air batteries may include an anode bundle and a battery housing. The anode bundle may include two or more loops of an anode wire. The anode wire may include an inert metal substrate core and an anode metal. The inert metal substrate core may have a surface and the anode metal may be coupled to the surface of the inert metal substrate core. The anode metal may include zinc. The battery housing may contain the anode bundle.

Some example methods related to producing rechargeable zinc air batteries may include depositing an anode metal on the surface of an inert metal substrate core to form an anode wire. The anode metal may include zinc. The anode wire may be arranged into an anode bundle, where the anode bundle may include two or more loops of the anode wire. The anode bundle may be incorporated into the rechargeable zinc air battery.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, and systems related to rechargeable zinc air batteries.

Some metal air batteries, such as zinc air batteries, may have a very high energy density, may be inexpensive to produce, and may be environmentally friendly. As primary (e.g., non-rechargeable) batteries, such metal air batteries have seen a growing market. However, such metal air batteries often have not been as successful as rechargeable batteries.

For example, metal-air anodes may be made of metal powder. Conventional zinc air batteries often include an anode that has zinc powder granules. During the discharge - charge cycle, the zinc powder granules may be oxidized and then reduced back to metal. During recharging of the battery, it may not be possible for the zinc powder granules to return to their original shape and/or orientation within the anode. Following one or more discharge - charge cycles, the shape and/or orientation (e.g., morphology) within the anode may change to such an extent that the granule-to-granule electrical contact may be compromised. Such a change in the granule-to-granule electrical contact may result in increasing internal resistance during each discharge-charge cycle and limited use as a rechargeable battery. Accordingly, such anodes may have increased metal migration, decreased metal-to-metal contact, and/or increased anode resistance as a result of recharging.

As will be discussed in greater detail below, a rechargeable zinc air battery may include an anode wire that has an anode metal coupled to a surface of an inert metal substrate core. As used herein the term "an inert metal substrate core" may refer to a substrate core that is non-reactive with respect to chemical processes occurring during a charge or discharge cycle in a metal air battery. Such an inert metal substrate core may be continuous along the length of the anode wire. Additionally, such an inert metal substrate core may not change form during the charge or discharge cycle and may retain its original shape. Accordingly, the inert metal substrate core may improve conductivity along the anode wire as well as allowing the anode metal to more easily maintain suitable morphology following one or more discharge - charge cycles. Additionally, such an anode wire may be arranged into any number of external shapes as an anode bundle, which may be suitable for adoption into existing battery forms.

Figure 1:
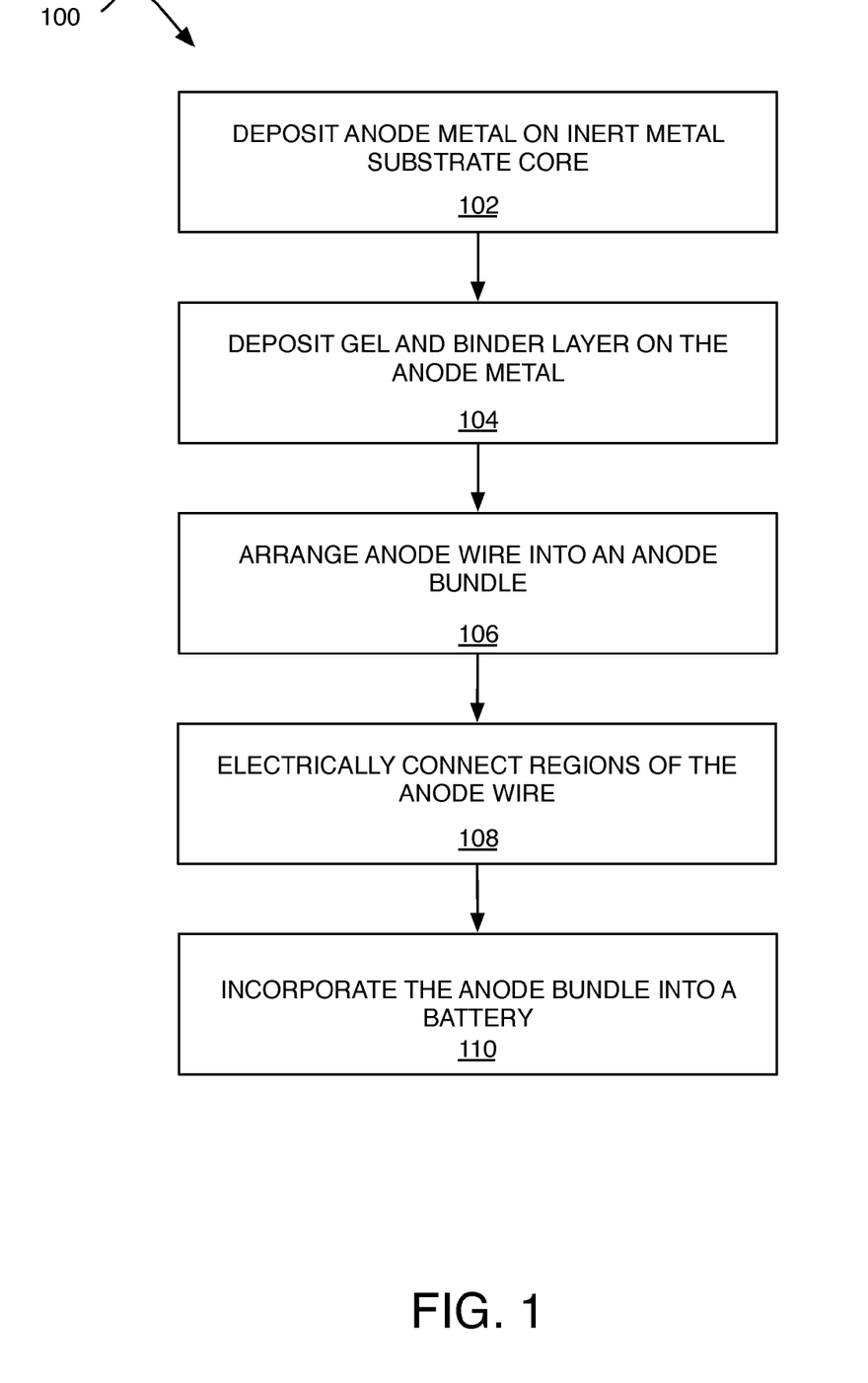
FIG. 1 is an illustration of an example process to produce a rechargeable zinc air battery.

FIG. 1 is an illustration of an example process 100 to produce a rechargeable zinc air battery that is arranged in accordance with at least some embodiments of the present disclosure. In the illustrated example, process 100, and other processes described herein, set forth various functional blocks or actions that may be described as processing steps, functional operations, events and/or acts, etc. Those skilled in the art in light of the present disclosure will recognize that numerous alternatives to the functional blocks shown in FIG. 1 may be practiced in various implementations. For example, although process 100, as shown in FIG. 1, comprises one particular order of blocks or actions, the order in which these blocks or actions are presented does not necessarily limit claimed subject matter to any particular order. Likewise, intervening actions not shown in FIG. 1 and/or additional actions not shown in FIG. 1 may be employed and/or some of the actions shown in FIG. 1 may be eliminated, without departing from the scope of claimed subject matter. Process 100 may include one or more of operations as illustrated by blocks 102, 104, 106, 108, and/or 110.

As illustrated, process 100 may be implemented to produce a rechargeable zinc air battery. Processing may begin at operation 102, "deposit anode metal on inert metal substrate core", where an anode metal may be deposited on a surface of an inert metal substrate core to form an anode wire. The operation of depositing of the anode metal may be accomplished via an electrochemical zinc plating bath, for example.

In one example, the inert metal substrate core may be selected so as not to be chemically reactive during charging and discharging of the rechargeable zinc air battery. For instance, the anode metal may include zinc or may be primarily composed of zinc and the inert metal substrate core may include a ductile metal wire with a more positive standard electric potential greater than zinc. Examples of substances that may be utilized for such an inert metal substrate core may include one or more of the following substances: copper, gold, palladium, platinum, cobalt, nickel, the like, and/or combinations thereof. In one example, copper has a standard electric potential of +0.34 volts (V), while zinc has a standard electric potential of −0.76V.

Processing may continue from operation 102 to operation 104, "deposit gel and binder layer on the anode metal", where a gel and binder layer may be deposited on the anode metal. Such a gel and binder layer may form a portion of the anode wire. For example, such a gel and binder layer may include an electrolyte permeable gel and an electrolyte resistant binder. Additionally or alternatively, a portion of the gel and binder layer may be removed from a first and second region of the two or more loops of the anode wire for later electrical connection.

As used herein, the term "electrolyte permeable gel" may refer to a polymeric substance that may permit electrolyte infiltration. Examples of such an electrolyte permeable gel may include: acrylate polymers, carboxymethyl cellulose, methyl cellulose, hydroxypropyl methyl cellulose, polyvinyl alcohol, polyethylene oxide, polyacrylate or salts thereof, starch (or a starch derivative), the like, and/or combinations thereof.

As used herein, term "electrolyte resistant binder" may refer to a polymeric substance that may preserve the mechanical stability of the gel and binder layer when exposed to electrolyte. For example, such an electrolyte resistant binder may counteract swelling to the electrolyte permeable gel during contact with the electrolyte. Examples of such an electrolyte resistant binder may include: polytetrafluoroethylene (PTFE), polyethylene, rayon fibers, polypropylene, rubber polymers, the like, and/or combinations thereof.

In some examples the gel and binder layer may be excluded from the anode wire. For example, the gel and binder may not be deposited on the anode metal. Additionally or alternatively, the anode metal itself may be substantially free of any electrolyte permeable gel and/or any electrolyte resistant binder.

Processing may continue from operation 104 to operation 106, "arrange anode wire into an anode bundle", where the anode wire may be arranged into an anode bundle. For example, such an anode bundle may include two or more loops of the anode wire. The operation of arranging of the anode wire into an anode bundle may include wrapping the anode wire around a mandrel, for example.

Processing may continue from operation 106 to operation 108, "electrically connect regions of the anode wire", where regions of the anode wire may be electrically connected. For example, a first region of the two or more loops of the anode wire may be electrically connected together, and a second region of the two or more loops of the anode wire may be electrically connected together.

Processing may continue from operation 108 to operation 110, "incorporate the anode bundle into a battery", where the anode bundle may be incorporated into a battery. For example, the anode bundle may be incorporated into the rechargeable zinc air battery.

Figure 2:
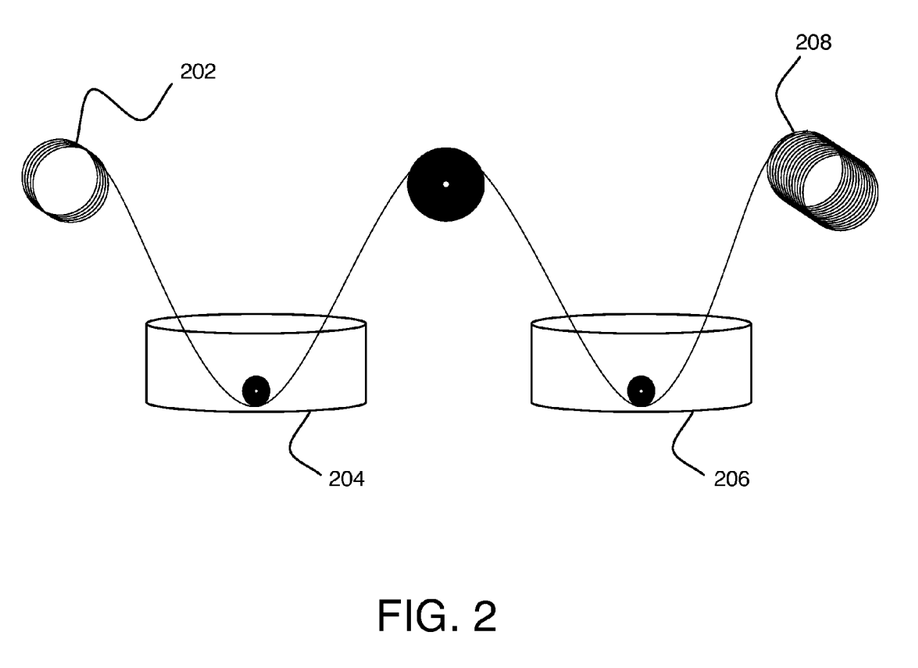
FIG. 2 is an illustration of an example process to produce an anode wire.

FIG. 2 is an illustration of an example process to produce an anode wire that is arranged in accordance with at least some embodiments of the present disclosure. In the illustrated example, a representative continuous spool-to-spool process for fabricating the anode wire is shown; however, other methods for fabricating the anode wire may be used.

A spool of wire of inert metal substrate core 202 may be run through a zinc plating bath 204. In examples where inert metal substrate core 202 is described as a "wire," inert metal substrate core 202 may have an elongated cylindrical-type shape, a flat ribbon-type shape, an elongated star-type shape, other radial geometry, or combinations thereof. However, shapes other than a "wire" may also be utilized for inert metal substrate core 202, such as plates and the like. Additionally or alternatively, in examples where inert metal substrate core 202 is described as a "wire," a diameter of such a wire may be as thin as practical (e.g., copper wire of 0.08 mm or thinner) to maximize the surface area of the anode metal in the final product.

A gel and binder layer may be deposited on the anode metal. For example, such a gel and binder layer may be deposited via a gel and binder layer bath 206, spray, and/or the like. A take-up spool may collect anode wire 208.

Figure 3:
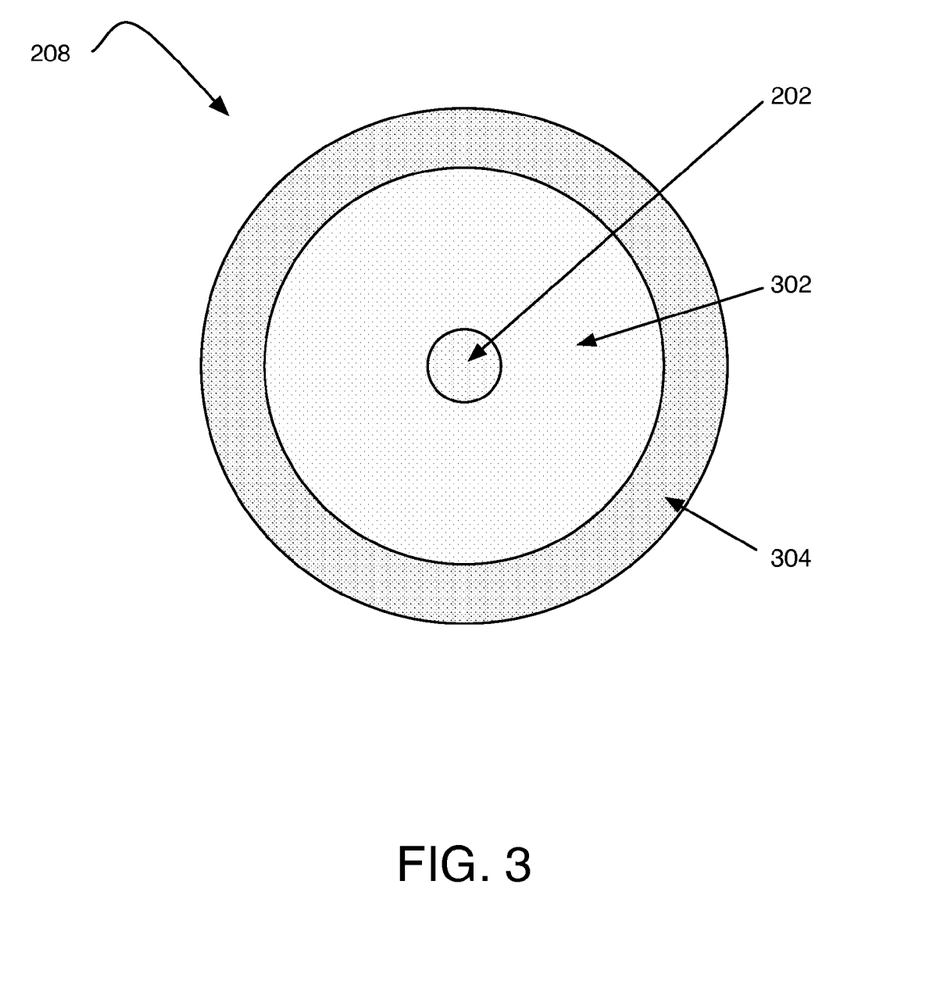
FIG. 3 is an illustration of an example cross-sectional side view of a portion of anode wire at a given stage of processing.

FIG. 3 is an illustration of an example cross-sectional side view of a portion of anode wire 208 at a given stage of processing, in accordance with at least some embodiments of the present disclosure. In the illustrated example, anode wire 208 may include an anode metal 302 coupled to a surface of inert metal substrate core 202. In some examples, anode wire 208 may be free from a gel and binder layer, either coated to the anode metal 302 or incorporated into the anode metal 302 layer itself. Alternatively, anode wire 208 may include a gel and binder layer 304 coupled to anode metal 302, wherein gel and binder layer 304 may include an electrolyte permeable gel and an electrolyte resistant binder, as was discussed in greater detail above.

Figure 4:
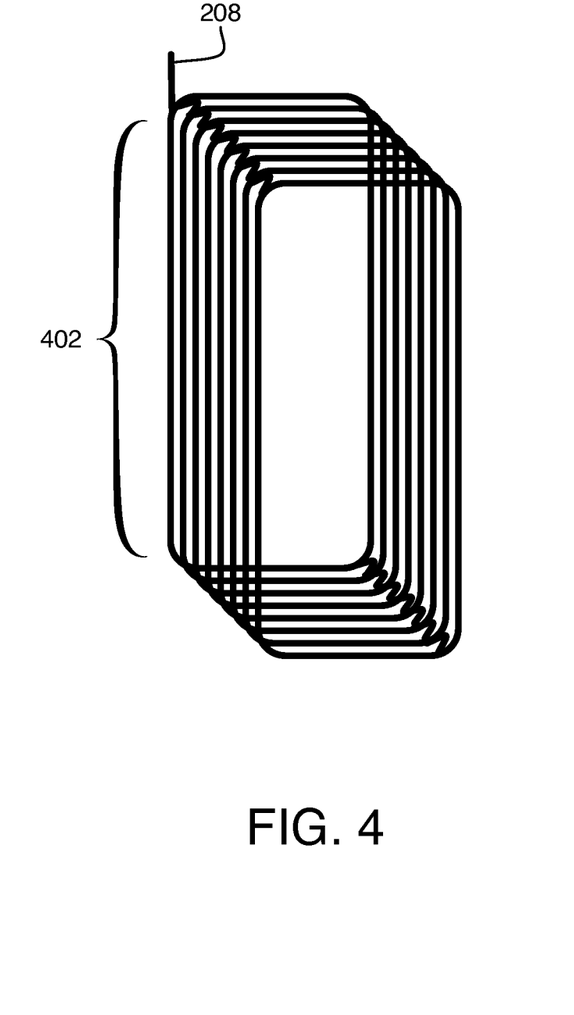
FIG. 4 is an illustration of an example perspective view of an anode bundle at a given stage of processing.

FIG. 4 is an illustration of an example perspective view of an anode bundle at a given stage of processing, in accordance with at least some embodiments of the present disclosure. In the illustrated example, anode wire 208 may be arranged into two or more loops to form an anode bundle 402. For example, the operation of arranging of anode wire 208 into anode bundle 402 may include wrapping anode wire 208 around a mandrel (not shown). In such an operation, anode bundle 402 may assume the shape of the selected mandrel. In the illustrated example, anode bundle 402 may assume the shape of the selected mandrel as a stack of two or more rectangular loops. However, other shapes may be utilized, such as a stack of two or more circular loops, a stack of two or more ovular loops, and/or the like.

Figure 5:
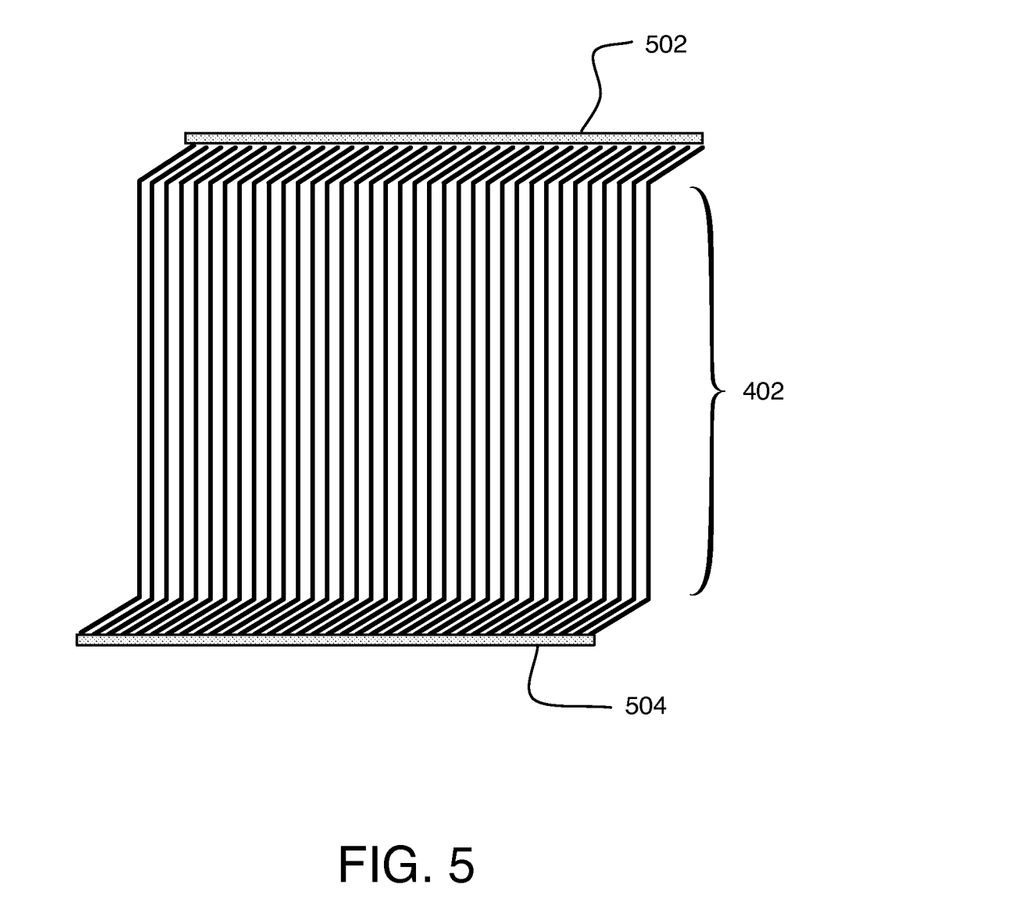
FIG. 5 is an illustration of another example perspective view of an anode bundle at a given stage of processing.

FIG. 5 is an illustration of another example perspective view of anode bundle 402 at a given stage of processing, in accordance with at least some embodiments of the present disclosure. In the illustrated example, a first region 502 of anode bundle 402 may be electrically connected together, and a second region 504 of anode bundle 402 may be electrically connected together. For example, such an electrical connection may achieve via a soldering process, conductive paste, or other technique for electrically connecting wires.

In examples utilizing the gel and binder layer (not shown), the gel and binder layer may be removed from first region 502 and second region 504 prior to electrically connecting first region 502 and second region 504. For example, the gel and binder layer may be removed from first region 502 and second region 504 chemically, mechanically, or thermally.

Figure 6:
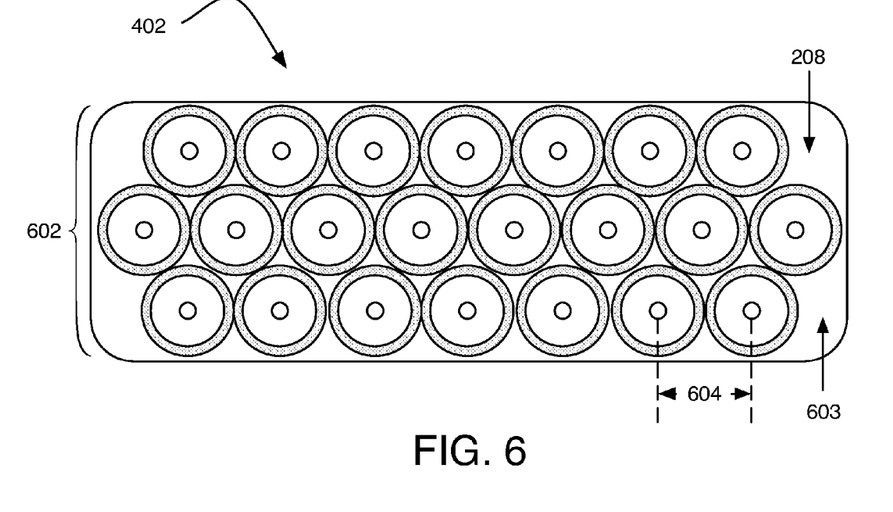
FIG. 6 is an illustration of an example cross-sectional side view of anode bundle at a given stage of processing.

FIG. 6 is an illustration of an example cross-sectional side view of anode bundle 402 at a given stage of processing, in accordance with at least some embodiments of the present disclosure. In the illustrated example, anode wire 208 may be wrapped more than a single time over the same or similar portion of the selected mandrel (not shown). While the example of FIG. 4 shows a single layer of wrapping of anode wire 208, other examples may have more than one layer 602 of anode wire 208 wrapped over the same or similar portion of the selected mandrel. Accordingly, such wrapping may control the number of layers 602 of anode wire 208 so as to adjust the diffusion distance of electrolyte 603 and anode density in the final product. Additionally or alternatively, such wrapping may be done with a tight or loose wrap (e.g., the space 604 between the two or more loops of anode wire 208) to adjust the electrolyte diffusion distance and anode density in the final product. Accordingly, by adjusting how tight anode wire 208 is wrapped around the mandrel and how many layers 602 are wrapped, the diffusion path of electrolyte 603 may be adjusted.

As illustrated, anode bundle 402 has a finite surface area. The finite amount of surface area may be utilized as a safety limit on maximum discharge rate to prevent combustion. For example, the wire size of inert metal substrate core 202 may be selected to allow the desired discharge rate but not a damaging discharge rate. Further, as discussed above, various shapes for inert metal substrate core 202 may be utilized, and each shape may have its own associated discharge profile. Accordingly, the shape of inert metal substrate core 202 may be selected to allow the desired discharge rate. The result of utilizing inert metal substrate core 202 may be reduced maximum current (Imax) output, but little or no change to the ampere-hours capacity. However, products such as cell phones, hearing aids, portable electronics, and laptops often do not require large bursts of power. Accordingly, a limit to maximum current output could provide a safety benefit to the user if the battery leads were accidently shorted.

Figure 7:
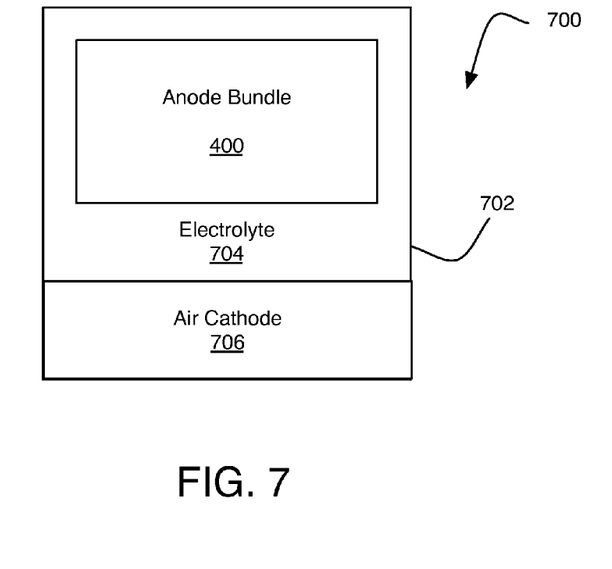
FIG. 7 is an illustration of an example battery, all arranged in accordance with at least some embodiments of the present disclosure.

FIG. 7 is an illustration of an example battery, in accordance with at least some embodiments of the present disclosure. In the illustrated example, anode bundle 402 may be incorporated into a battery 700. For example, anode bundle 402 may be incorporated into a battery housing 702 of a rechargeable zinc air battery, where battery housing 702 may contain the anode bundle 402, electrolyte 704, and/or air cathode 706.

The resulting batteries 700 may have a variety of shapes. For example, anode bundle 402 can be arranged in a flat orientation to be suitable for flat-pack rechargeable metal-air batteries, or curved to accommodate other product form factors. Alternatively, battery 700 may be oriented and arranged so as to be suitable for various products such as cell phones, hearing aids, portable electronics, laptops and/or the like.

In one example, air cathode 706 may be of similar geometry as compared to anode bundle 402. In such an example, battery 700 may have a cylindrical shape, for example.

Other components of battery 700 are contemplated, but not illustrated here. For example, battery 700 may include air access apertures in housing 702, an anode can adapted to house anode bundle 402 within housing 702, a separator fabric saturated with electrolyte, a cathode (e.g., a metallic screen coated or impregnated with a catalyst such as Ag, Pt, Pt—Ru, spinel, perovskites, Fe, Ni, or the like), a cathode can adapted to house a cathode within housing 702, a hydrophobic layer adapted to prevent moisture from entering battery 700 and flooding the cathode, one or more air distribution membranes and/or air diffusion layers, and/or the like. Those skilled in the art in light of the present disclosure will recognize that numerous alternative components may be utilized in various implementations. For example, some of the components listed above may be eliminated or replaced with alternative components. Likewise, additional components not explicitly listed above may be employed, without departing from the scope of claimed subject matter.

Figure 8:
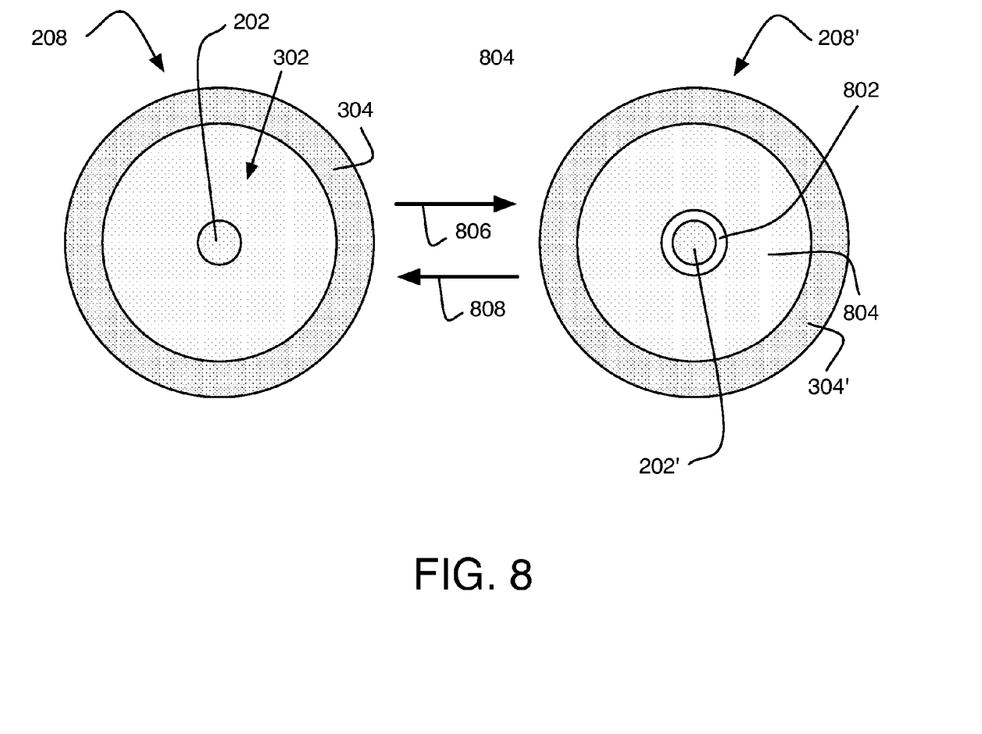
FIG. 8 is an illustration of an example cross-sectional side view of a portion of anode wire in operation.

FIG. 8 is an illustration of an example cross-sectional side view of a portion of anode wire in operation, in accordance with at least some embodiments of the present disclosure. In the illustrated example, charged anode wire 208 may include anode metal 302 coupled to a surface of inert metal substrate core 202 as well as gel and binder layer 304 coupled to anode metal 302.

During discharging operations (illustrated by arrow 806) charged anode wire 208 may be modified via chemical reaction into a discharged anode wire 208'. Discharged anode wire 208' may include a portion of non-discharged anode metal 802 coupled to a surface of inert metal substrate core 202'. Non-discharged anode metal 802 and inert metal substrate core 202' are substantially unchanged either chemically or morphologically as compared with anode metal 302 and inert metal substrate core 202 associated with charged anode wire 208. Discharged anode wire 208' may also include a portion of oxidized anode metal 804 as well as gel and binder layer 304' coupled to oxidized anode metal 804. Discharged anode metal 804 may be changed chemically and/or morphologically as compared with anode metal 302 associated with charged anode wire 208.

During discharge, a reaction occurs at anode metal 302 and electrolyte surrounding charged anode wire 208. For example, during discharge, zinc (Zn) is converted to soluble zincate ($Zn(OH)_4^{2-}$ and insoluble zinc oxide (ZnO) as follows:

At anode metal 302: $Zn + 4OH^- \rightarrow Zn(OH)_4^{2-} + 2e^-$

At the electrolyte fluid: $Zn(OH)_4^{2-} \rightarrow ZnO + H_2O + 2OH^-$

Accordingly, the zinc of anode metal 302 may be converted to insoluble zinc oxide of discharged anode metal 804. The discharging reaction (as well as the charging reaction) may occur from the outside diameter of anode metal 302 toward inert metal substrate core 202. For example, such discharge results in the replacement of anode metal 302 (e.g., zinc) with a material (e.g., zinc oxide) that may conduct the electrolyte, so there may be no self-passivation. The discharging reaction may stop when anode metal 302 has been fully depleted, and inert metal substrate core 202 will remain in its original form. The conversion of anode metal 302 to oxidized anode metal 804 may involve some volumetric change; however, such volumetric change may be absorbed by gel and binder layer 304.

During charging (illustrated by arrow 808), the reverse reactions may occur at discharged anode metal 804. For example, the insoluble zinc oxide of discharged anode metal 804 may be converted to zinc of anode metal 302. During charging, zinc oxide of discharged anode metal 804 may be converted to zinc of anode metal 302 so as to be deposited on inert metal substrate core 202' (and/or non-discharged anode metal 802) until the zinc of anode metal 302 is re-formed.

The re-depositing of zinc of anode metal 302 onto inert metal substrate core 202' (and/or non-discharged anode metal 802) may return anode metal 302 to a substantially similar morphology (e.g., similar shape and/or orientation) due in part to the stability of inert metal substrate core 202'. Additionally, inert metal substrate core 202' may facilitate electrical contact to all regions of discharged anode wire 208', even in cases where non-discharged anode metal 802 has been nearly or completely depleted.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A method to produce a rechargeable zinc air battery, comprising:
   depositing an anode metal on the surface of an inert metal substrate core to form an anode wire;
   arranging the anode wire into an anode bundle, wherein the anode bundle comprises two or more loops of the anode wire;
   wrapping the two or more loops of the anode wire into layers, wherein a closeness of the loops in the layers is chosen to provide a particular electrolyte diffusion distance in the anode bundle; and
   incorporating the anode bundle into the rechargeable zinc air battery.

2. The method of claim 1, wherein the inert metal substrate core has a positive standard electric potential greater than zinc.

3. The method of claim 1, wherein inert metal substrate core comprises one or more of: copper, gold, palladium, platinum, cobalt, and nickel.

4. The method of claim 1, wherein the depositing of the anode metal comprises depositing of the anode metal via a electrochemical zinc plating bath.

5. The method of claim 1, wherein the arranging the anode wire into an anode bundle comprises wrapping the anode wire around a mandrel.

6. The method of claim 1, further comprising:
   electrically coupling a first region adapted to operably couple the two or more loops of the anode wire together in electrical communication; and
   electrically coupling a second region adapted to operably couple the two or more loops of the anode wire.

7. The method of claim 1, wherein a gel and binder layer is not deposited on the anode metal.

8. The method of claim 1, further comprising depositing a gel and binder layer on the anode metal, wherein the gel and binder layer forms a portion of the anode wire, and wherein the gel and binder layer comprises an electrolyte permeable gel and an electrolyte resistant binder.

9. The method of claim 1, further comprising:
   depositing a gel and binder layer on the anode metal, wherein the gel and binder layer may form a portion of the anode wire, and wherein the gel and binder layer comprises an electrolyte permeable gel and an electrolyte resistant binder;
   removing a portion of the gel and binder layer from a first region and second region of the two or more loops of the anode wire;
   electrically coupling the first region adapted to operably couple the two or more loops of the anode wire together in electrical communication; and
   electrically coupling the second region adapted to operably couple the two or more loops of the anode wire together in electrical communication.

10. The method of claim 1, further comprising shaping the inert metal substrate core to configure the inert metal substrate core to reduce a threshold current output of the zinc air battery resulting in little or no change in an ampere-hours capacity of the zinc air battery.

11. The method of claim 1, further comprising shaping the inert metal substrate core to configure the inert metal substrate core in an elongated flat ribbon-type shape.

12. A rechargeable zinc air battery, comprising:
   an anode bundle, wherein the anode bundle comprises two or more loops of an anode wire, the anode wire comprising:
      an inert metal substrate core having a surface,
      an anode metal coupled to the surface of the inert metal substrate core, wherein the anode metal comprises zinc; and
   a battery housing, the battery housing containing the anode bundle, wherein the anode wire is arranged in layers within the battery housing to provide a particular distance between a first portion of the anode wire and a second portion of the anode wire to set a diffusion distance of an electrolyte and an anode density in the zinc air battery.

13. The rechargeable zinc air battery of claim 12, wherein the inert metal substrate core has a positive standard electric potential greater than zinc.

14. The rechargeable zinc air battery of claim 12, wherein the inert metal substrate core has an elongated cylindrical-type shape.

15. The rechargeable zinc air battery of claim 12, wherein the inert metal substrate core has an elongated flat ribbon-type shape.

16. The rechargeable zinc air battery of claim 12, wherein inert metal substrate core comprises one or more of: copper, gold, palladium, platinum, cobalt, and nickel.

17. The rechargeable zinc air battery of claim 12, wherein the anode bundle further comprises:
   a first region adapted to operably couple the two or more loops of the anode wire together in electrical communication; and
   a second region adapted to operably couple the two or more loops of the anode wire together in electrical communication.

18. The rechargeable zinc air battery of claim 12, wherein the anode wire is free from a gel and binder layer.

19. The rechargeable zinc air battery of claim 12, wherein the anode wire further comprises a gel and binder layer coupled to the anode metal, wherein the gel and binder layer comprises an electrolyte permeable gel and an electrolyte resistant binder.

20. The rechargeable zinc air battery of claim 12, wherein the anode wire is arranged in a close wrap of the two or more loops.

21. An anode wire of a zinc air battery, comprising:
   an inert metal substrate core having a surface; and
   an anode metal coupled to the surface of the inert metal substrate core, wherein the anode metal comprises zinc, wherein the anode wire is arranged into a plurality of overlapped layers of two or more loops that are arranged to a particular closeness of the loops of the overlapped layers, wherein the closeness of the loops in the overlapped layers and a number of the overlapped layers are chosen to set a particular diffusion distance of an electrolyte in the zinc air battery.

22. The anode bundle of claim 21, wherein the inert metal substrate core has an elongated cylindrical-type shape.

23. The anode bundle of claim 21, wherein the anode wire is free from a gel and binder layer.

24. The anode bundle of claim 21, wherein the anode wire further comprises a gel and binder layer coupled to the anode metal, wherein the gel and binder layer comprises an electrolyte permeable gel and an electrolyte resistant binder.

25. The anode wire of claim 21, wherein the anode wire is arranged to leave a space between the two or more loops, wherein an increased closeness of the two or more loops to reduce the space corresponds to a decreased diffusion distance and a decreased closeness of the two or more loops to increase the space corresponds to an increased diffusion distance.

26. The anode wire of claim 25, wherein the anode wire arranged into the plurality of layers of the two or more loops has a shape that assumes a shape of a mandrel on which the loops were wrapped.

* * * * *